(12) United States Patent
Griffin et al.

(10) Patent No.: US 11,714,692 B2
(45) Date of Patent: Aug. 1, 2023

(54) CLASSICAL MANAGEMENT OF QUBIT REQUESTS

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/332,543

(22) Filed: May 27, 2021

(65) Prior Publication Data

US 2022/0382605 A1      Dec. 1, 2022

(51) Int. Cl.
  *G06F 9/54*   (2006.01)
  *G06N 10/00*  (2022.01)

(52) U.S. Cl.
  CPC .............. *G06F 9/546* (2013.01); *G06N 10/00* (2019.01)

(58) Field of Classification Search
  CPC ................................ G06F 9/546; G06N 10/00
  See application file for complete search history.

(56) References Cited

U.S. PATENT DOCUMENTS

| | | |
|---|---|---|
| 7,248,695 B1 | 7/2007 | Beal et al. |
| 8,510,618 B1 | 8/2013 | Pesetski et al. |
| 9,654,287 B2 | 5/2017 | Zhao et al. |
| 10,592,216 B1 | 3/2020 | Richardson et al. |
| 10,776,544 B2 | 9/2020 | Delaney et al. |
| 10,885,457 B2 | 1/2021 | Weichenberger |
| 11,070,471 B1 * | 7/2021 | Chang .................... H04L 45/66 |
| 2013/0019051 A1 | 1/2013 | Somanache et al. |

(Continued)

FOREIGN PATENT DOCUMENTS

| | | | |
|---|---|---|---|
| CN | 108984301 B | 12/2020 | |
| WO | WO-2020033974 A1 * | 2/2020 | ............ G06F 11/004 |
| WO | WO-2020072819 A1 * | 4/2020 | ............ G06N 10/00 |

OTHER PUBLICATIONS

Author Unknown, "Rigetti Computing Opens Their Quantum Cloud Service (QCS) for Public Beta," dotQuantum.io, 2018, https://www.dotquantum.io/en/dotquantum-news/rigetti-computing-opens-their-quantum-cloud-service-qcs-for-public-beta/, 3 pages.

(Continued)

*Primary Examiner* — Umut Onat
*Assistant Examiner* — Kimberly L Jordan
(74) *Attorney, Agent, or Firm* — Dority & Manning, P.A.

(57) ABSTRACT

Classical management of qubit requests is provided. In particular, a classical computing device receives a payload from another classical computing device via a classical computing connection, such as a Hypertext Transfer Protocol (HTTP) connection. The classical computing device queries a quantum computing device regarding availability of a qubit, whether targeted or agnostic, according to instructions provided in the payload. Such instructions may include inserting data into a qubit, manipulating a qubit, and/or reserving a qubit. If the qubit is available, the classical computing device sends the payload to the quantum computing device. If the qubit is unavailable, the classical computing device continues to query the quantum computing device until the qubit is available. Such a configuration provides granular control of qubits by a classical computing device and/or shifts management loads from the quantum computing device to the classical computing device.

18 Claims, 7 Drawing Sheets

(56) References Cited

U.S. PATENT DOCUMENTS

| | | | | |
|---|---|---|---|---|
| 2018/0144262 A1* | 5/2018 | Roetteler | | B82Y 10/00 |
| 2019/0378032 A1 | 12/2019 | Kliuchnikov et al. | | |
| 2019/0394030 A1 | 12/2019 | Forbes et al. | | |
| 2020/0074346 A1* | 3/2020 | Griffin | | G06N 10/00 |
| 2020/0128063 A1* | 4/2020 | Griffin | | H04L 69/22 |
| 2020/0201379 A1 | 6/2020 | Hogaboam et al. | | |
| 2020/0334088 A1 | 10/2020 | Casillas et al. | | |
| 2021/0019189 A1 | 1/2021 | Eker et al. | | |
| 2021/0182096 A1 | 6/2021 | Walker et al. | | |
| 2021/0266254 A1* | 8/2021 | Trossen | | H04L 45/42 |
| 2021/0279628 A1 | 9/2021 | Noel et al. | | |

OTHER PUBLICATIONS

Bartlett, S. et al., "Classical and quantum communication without a shared reference frame," arXiv:quant-ph/0302111v3, Jul. 8, 2003, 4 pages.

Cacciapuoti, A. et al., "When Entanglement Meets Classical Communications: Quantum Teleportation for the Quantum Internet," IEEE Transactions on Communications, vol. 68, Issue 6, Mar. 2020, 27 pages.

Chong, F. et al., "Programming languages and compiler design for realistic quantum hardware," Nature, vol. 549, Sep. 14, 2017, Macmillan Publishers Limited, pp. 180-187.

Johnston, E. et al., "Chapter 4. Quantum Teleportation," in Programming Quantum Computers, Jul. 2019, O'Reilly Media, Inc., https://www.oreilly.com/library/view/programming-quantum-computers/9781492039679/ch04.html, 20 pages.

Manzalini, A., "Quantum Communications in Future Networks and Services," Quantum Reports, vol. 2, Mar. 2020, MDPI, pp. 221-232.

Pang, X. et al., "Hacking Quantum Key Distribution via Injection Locking," arXiv:1902.10423v3 [quant-ph], Mar. 4, 2020, 10 pages.

Jiang, S.-X. et al., "Cyclic Hybrid Double-Channel Quantum Communication via Bell-State and GHZ-State in Noisy Environments," IEEE Access, vol. 7, Jun. 2019, IEEE, 12 pages.

Notice of Allowance and Examiner-Initiated Interview Summary for U.S. Appl. No. 17/332,198, dated Mar. 2, 2022, 15 pages.

Non-Final Office Action for U.S. Appl. No. 17/843,704, dated Apr. 12, 2023, 26 pages.

\* cited by examiner

CLASSICAL MANAGEMENT OF QUBIT REQUESTS

BACKGROUND

Quantum computing utilizes qubits to perform quantum calculations. Quantum computing is increasing in popularity and becoming more commonplace.

SUMMARY

The implementations disclose classical management of qubit requests. In particular, a classical computing device receives a payload from another classical computing device via a classical computing connection, such as a Hypertext Transfer Protocol (HTTP) connection. The classical computing device queries a quantum computing device regarding availability of a qubit, whether targeted or agnostic, according to instructions provided in the payload. Such instructions may include inserting data into a qubit, manipulating a qubit, and/or reserving a qubit. If the qubit is available, the classical computing device sends the payload to the quantum computing device. If the qubit is unavailable, the classical computing device continues to query the quantum computing device until the qubit is available. Such a configuration provides granular control of qubits by a classical computing device and/or shifts management loads from the quantum computing device to the classical computing device.

In one implementation, a method is provided. The method includes receiving, by a first classical computing device comprising one or more processor devices, a message sent from a second classical computing device toward a quantum computing device. The message includes a header and a payload. The payload providing instructions for at least one qubit within the quantum computing device. The method further includes extracting, by the first classical computing device, the payload from the message. The method further includes sending, by the first classical computing device, a query to the quantum computing device regarding availability of the at least one qubit. The method further includes receiving, by the first classical computing device, from the quantum computing device a reply confirming availability of the at least one qubit. The method further includes sending, by the first classical computing device, the payload to the quantum computing device.

In another implementation, a computing system is provided. The computing system includes one or more processor devices. The one or more processor devices receive, by a first classical computing device comprising one or more processor devices, a message sent from a second classical computing device toward a quantum computing device. The message includes a header and a payload. The payload provides instructions for at least one qubit within the quantum computing device. The one or more processor devices extract, by the first classical computing device, the payload from the message. The one or more processor devices send, by the first classical computing device, a query to the quantum computing device regarding availability of the at least one qubit. The one or more processor devices receive, by the first classical computing device, from the quantum computing device a reply confirming availability of the at least one qubit. The one or more processor devices send, by the first classical computing device, the payload to the quantum computing device.

In another implementation, a computer program product is provided. The computer program product is stored on a non-transitory computer-readable storage medium and includes instructions to cause a processor device of a first classical computing device to receive a message sent from a second classical computing device toward a quantum computing device. The message includes a header and a payload. The payload provides instructions for at least one qubit within the quantum computing device. The instructions cause the processor device to extract the payload from the message. The instructions cause the processor device to send a query to the quantum computing device regarding availability of the at least one qubit. The instructions cause the processor device to receive from the quantum computing device a reply confirming availability of the at least one qubit. The instructions cause the processor device to send the payload to the quantum computing device.

Those skilled in the art will appreciate the scope of the disclosure and realize additional aspects thereof after reading the following detailed description of the implementations in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A or B, or both A and B.

Quantum computing utilizes qubits to perform quantum calculations. Quantum computing is increasing in popularity and becoming more commonplace.

Quantum computing systems perform computations utilizing quantum-mechanical phenomena, such as superposition and entanglement. Unlike classical computing systems that process data encoded in binary bits, each of which is always in one of two definite states ("0" or "1"), quantum computing systems process data in units of quantum bits (qubits) that can be in superpositions of states. "Superposition" means that each qubit can represent both a "1" and a "0" at the same time. The qubits in a superposition can be correlated with each other (referred to as "entanglement"). That is, the state of a given qubit (whether it is a "1" or a "0") can depend on the state of another qubit. A quantum computing system with N qubits can be in a superposition of up to 2N states simultaneously. Compared to the classical computing systems that can only be in one of these 2N states at a particular time, quantum computing systems have higher computing power and may solve difficult problems that are intractable using the classical computing systems.

Classical computing systems and classical networking involve the use of protocols to exchange information between two connected nodes, such as two classical computing systems, in a network. Such nodes could be any networking hardware (such as routers) or service. One of the most popular protocols for communicating on the internet is Hypertext Transfer Protocol (HTTP). Quantum computing has no defined protocol recommendation to date, and thus there are no standardized mechanisms for communicating between a classical computing system and a quantum computing system. The examples implement a classical computing system to manage and control qubits.

The implementations disclose classical management of qubit requests. In particular, a classical computing device receives a payload from another classical computing device via a classical computing connection, such as an HTTP connection. The classical computing device queries a quantum computing device regarding availability of a qubit, whether targeted or agnostic, according to instructions provided in the payload. Such instructions may include inserting data into a qubit, manipulating a qubit, and/or reserving a qubit. If the qubit is available, the classical computing device sends the payload to the quantum computing device. If the qubit is unavailable, the classical computing device continues to query the quantum computing device until the qubit is available. Such a configuration provides granular control of qubits by a classical computing device and/or shifts management loads from the quantum computing device to the classical computing system.

Figure 1:
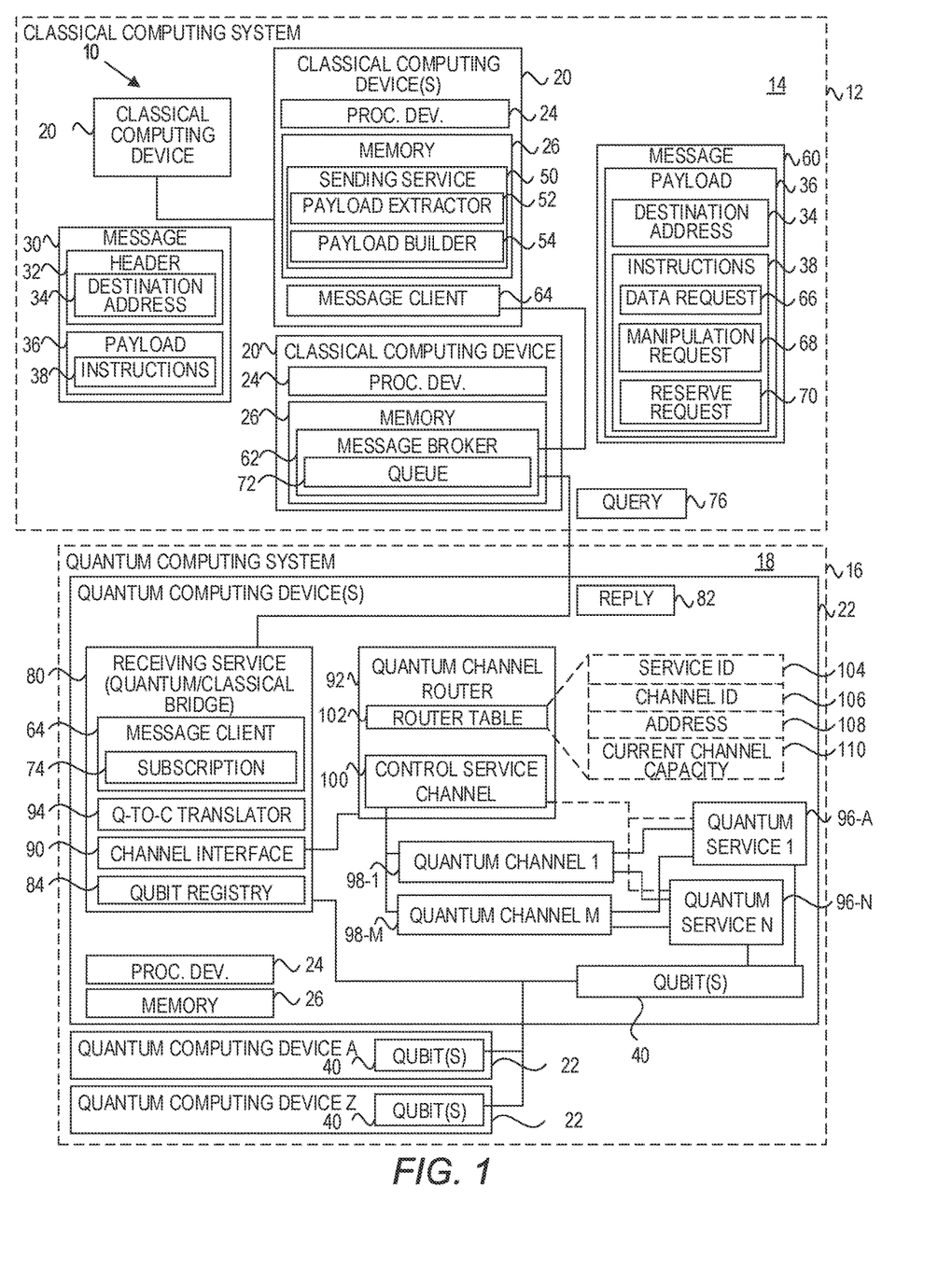
FIG. 1 is a block diagram of a system for controlling qubits from a classical computing system illustrating certain aspects of various implementations disclosed herein.

FIG. 1 is a block diagram of a system 10 for controlling qubits from a classical computing system 12, illustrating certain aspects of various implementations disclosed herein. The system 10 includes one or more classical computing systems 12 that operate in classical computing environments 14 and one or more quantum computing systems 16 that operate in a quantum computing environment 18. The phrase "classical environment" refers to any conventional computing systems that operate using binary digits that have a value of either 1 or 0. The phrase "quantum environment" refers to computing systems that perform computations utilizing quantum-mechanical phenomena, such as superposition and entanglement. The quantum computing system 16 operates in a quantum environment but can operate using classical computing principles or quantum computing principles. When using quantum computing principles, the quantum computing system 16 performs computations that utilize quantum-mechanical phenomena, such as superposition and entanglement. The quantum computing system 16 may operate under certain environmental conditions, such as at or near 0° Kelvin. When using classical computing principles, the quantum computing system 16 utilizes binary digits that have a value of either 1 or 0.

The classical computing system 12 may include one or more classical computing devices 20, and the quantum computing system 16 may include one or more quantum computing devices 22. Each of the classical computing devices 20 and/or quantum computing devices 22 may include a processor device 24 coupled to a memory 26. It is noted that for illustrative purposes, to reduce space, only some of the classical computing devices 20 and/or quantum computing devices 22 and other computer components are shown with a processor device 24 and a memory 26. However, each of the classical computing devices 20, quantum computing devices 22, and/or other computer components, may include a processor device 24 and/or a memory 26. Further, each of the classical computing devices 20 may include a plurality of classical computing devices 20. Each of the quantum computing devices 22 may include a plurality of quantum computing devices 22.

One classical computing device 20 sends a message 30 to a classical computing device 20 within the classical computing system 12. The message 30 includes a header 32 with a destination address 34. In certain implementations, the header 32 includes an HTTP header. The destination address 34 may be directed toward a quantum computing device 22. However, the classical computing device 20 intercepts the message 30 for processing, thereby acting as a proxy for the quantum computing device 22. The message 30 includes a payload 36 with instructions 38 directed to a qubit 40 of the quantum computing system 16.

The classical computing system 12 includes a sending service 50 that operates to provide a bridge between the classical computing environment 14 and the quantum computing environment 18. The sending service 50 includes a payload extractor 52 that is configured to receive a message 30 within the classical computing environment 14. In certain implementations, the sending service 50 includes a payload builder 54 that is configured to receive a message generated in the quantum computing system 16 and generate a suitably formatted message 30 for transmission within the classical computing environment 14.

The payload extractor 52 of the sending service 50 receives the message 30, extracts the header 32, and determines the originator address and a destination address 34. In certain implementations, the destination address 34 is the destination internet protocol (IP) address of a qubit 40 in the header 32; although in other examples, the destination qubit 40 may be identified by other data in one or more other fields of the header 32. The payload extractor 52 extracts from the message 30, the payload 36 and sends the payload 36, the originator address, and the destination quantum service identifier in a message 60 to a message broker 62 via a message client 64. The message 60 includes a payload 36 with the destination address 34 and instructions 38. In certain implementations, the payload 36 includes at least one destination address 34 of at least one qubit 40, where identifying the qubit 40 is targeted. In other implementations, the payload 36 is devoid of a destination address 34 of a qubit 40, where identifying the qubit 40 is agnostic. In certain implementations, the payload 36 is devoid of identification of a quantum service or quantum computing device 22. In certain implementations, the payload 36 includes a Quantum Assembly Language (QASM) file.

In certain implementations, the instructions 38 include a data request 66 to insert data into at least one qubit 40, a manipulation request 68 to modify a characteristic of at least one qubit 40, and/or a reserve request 70 to reserve at least one qubit 40. In certain implementations, one of the characteristics to modify includes at least one of spin, polarization, superposition, or entanglement of the qubit 40.

The message broker 62, which may also be referred to as a message bus, includes a message queue 72, where the message broker 62 temporarily stores the message 60. In certain implementations, the message broker 62 uses an Advanced Messaging Queuing Protocol (AMQP) message service. A similar message client 64 is used by other components in communication with the message broker 62. However, it is noted that the message broker 62 is optional and that instead, the classical computing device 20 may communicate directly with the quantum computing device 22.

Once the message broker 62 receives the message 60, the message broker 62 sends a query 76 to the quantum computing device 22. In certain implementations, the quantum computing device 22 uses a subscription service to communicate with the message broker 62. For example, in certain implementations, the message broker 62 facilitates communication between publisher components and subscriber components. The message broker 62 is configured to validate, store, route, and deliver messages to appropriate destinations based on attributes of the messages. In a publish-subscribe framework, subscriber components (i.e., receivers of messages) identify criteria of messages of interest to the subscriber components. The message broker 62 receives a message from a publisher component, analyzes the content of the message and/or metadata associated with the message with reference to the criteria identified by any subscriber components, and if the message matches any such criteria, forwards the message to the corresponding subscriber component(s) based on a subscription 74. A component that interacts with the message broker 62 may be both a publisher and a subscriber at different times, depending on whether the component is sending or receiving a message. Such a configuration may be used when the instructions 38 of the payload 36 are agnostic as to which qubits 40 or which quantum computing device 22 is used. Further, such a configuration may be used when multiple classical computing devices 20 are communicating with multiple quantum computing devices 22.

In certain implementations, the message broker 62 use message queues 72, where messages 60 and/or queries 76 are placed and stored until a subscriber retrieves the message. In certain implementations, the message broker 62 may use a pull model (e.g., Apache Kafka), where subscribers periodically check the queue for updates. In certain implementations, the message broker 62 may use a push model (e.g., RabbitMQ), where the message broker 62 notifies subscribers of an update to the queue. Use of the message broker 62 ensures that the message 60, query 76, and/or any other message is delivered to only one subscriber. Such coordination prevents redundancies and potential conflicts.

The message broker 62 receives the message 60 and places the message 60 in a message queue 72. In certain implementations, the message broker 62 also generates a query 76 based on the message 60 and puts the query 76 into the message queue 72. In other implementations, the message broker 62 sends the query 76 to the quantum computing device 22 directly. The query 76 inquires as to availability of qubits 40. For example, the query 76 may be agnostic and inquire as to availability of qubits 40 of one or more quantum computing devices 22. In other implementations, the query 76 is targeted and inquires as to availability of specific qubits 40 of one or more quantum computing devices 22.

The query 76 is sent to the quantum computing device 22. In particular, the query 76 is sent to a receiving service 80 of the quantum computing device 22 inquiring as to the availability of qubits 40. The quantum computing device 22 sends a reply 82 confirming or denying availability of qubits 40. For example, in certain implementations, the receiving service 80 consults a qubit registry 84 to check availability of the identified qubits 40. In certain implementations, the qubit registry 84 coordinates availability of qubits 40 among a plurality of quantum computing devices 22. In this way, in certain implementations, the query 76 is sent to the receiving service 80 of one quantum computing device 22, which may then communicate with one or more quantum computing devices. In other implementations, multiple queries 76 may be sent to receiving services 80 across multiple quantum computing devices 22.

If the reply 82 confirms availability of the qubits 40, then the message broker 62 sends the message 60 to the receiving service 80. If the reply denies availability of the qubits 40, then the message broker 62 holds the message 60 in the message queue 72. The message broker 62 then periodically sends another query 76 to the quantum computing device 22 until the requested qubits 40 are available. Once the message 60 is delivered to the quantum computing device 22, the message 60 is removed from the message queue 72.

In some implementations, the message broker 62 facilitates communication of the message 60 across multiple quantum computing devices 22. For example, the requested qubits 40 may be located across more than one quantum computing device 22.

In certain implementations, the quantum-to-classical translator 94 (also referred to herein as a Q-to-C translator) receives reply messages from the quantum channel router 92 and determines whether the reply message is in a classical bit format and is thus ready for transmission to the classical computing environment 14, or is in a qubit format, and thus should be first translated from the qubit format to the classical computing format by the Q-to-C translator 94. Once sent to the classical computing device 20, the payload builder 54 of the sending service 50 may generate a message 30 with a header 32 and a payload 36 for transmission to the classical computing device 20.

The receiving service 80 also includes a channel interface 90 that is configured to facilitate bi-directional communications between the receiving service 80 and a quantum channel router 92. The receiving service 80 includes a Q-to-C translator 94 that translates, or converts, quantum information in the form of qubits to classical binary information in the form of 1 s and 0 s.

The quantum computing system 16 includes a plurality of quantum services 96-A-96-N (generally quantum services 96). As used herein, the term "quantum service" refers to a quantum application that accesses one or more qubits 40 and provides some desired functionality. While for purposes of illustration, only two quantum services 96 are illustrated, the examples are not limited to any particular number of quantum services 96, and in practice, the quantum computing system 16 may have tens, hundreds, or even thousands of quantum services 96. Each of the quantum services 96 is coupled to one or more quantum channels 98-1 and 98-M (generally quantum channels 98). The quantum channels 98 are, in turn, communicatively coupled to the quantum channel router 92.

The quantum channel router 92 includes, or in other examples is communicatively coupled to, a control service channel 100 on which service identifiers may be advertised by each quantum service 96, such that each quantum service 96 is aware of every other quantum service 96. Thus, the quantum services 96 are also communicatively coupled to the control service channel 100.

The quantum channel router 92 receives messages from the receiving service 80. The quantum channel router 92 accesses a router table 102 to determine the quantum channel 98 associated with the quantum service 96 identified by the destination quantum service identifier. The router table 102 contains information that describes a current state of various components in the quantum computing system 22. In this example, and at this point in time, the router table 102 has data fields, such as a service ID 104 that identifies a particular quantum service 96, a channel ID 106 that identifies a particular quantum channel 98, an address 108 associated with a quantum service identifier, a current channel capacity 110 of the quantum channel 98 to which the associated quantum service 96 listens.

Figure 2:
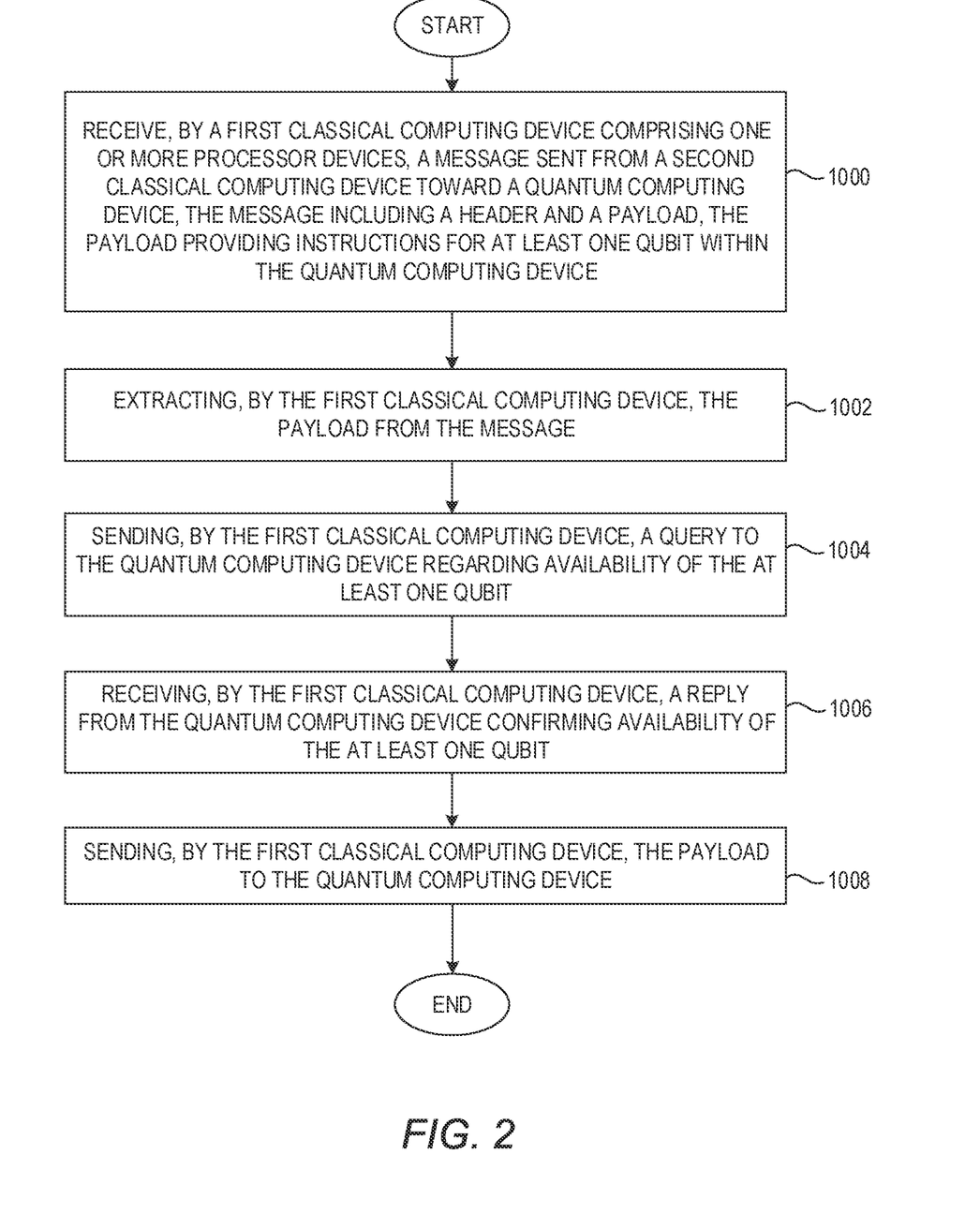
FIG. 2 is a flowchart of a method for controlling qubits from a classical computing device according to some examples.

FIG. 2 is a flowchart illustrating a method for signing files via a publish-subscribe message service according to one implementation. FIG. 2 will be discussed in conjunction with FIG. 1. A first classical computing device 20 comprising one or more processor devices 24 receives a message 30 sent from a second classical computing device 20 toward a quantum computing device 22. The message 30 includes a header 32 and a payload 36. The payload 36 provides instructions 38 for at least one qubit 40 within the quantum computing device 22 (block 1000). The first classical computing device 20 extracts the payload 36 from the message 30 (block 1002). The first classical computing device 20 sends a query 76 to the quantum computing device 22 regarding availability of the at least one qubit 40 (block 1004). The first classical computing device 20 receives from the quantum computing device 22 a reply 82 confirming availability of the at least one qubit 40 (block 1006). The first classical computing device 20 sends the payload 36 to the quantum computing device 22 (block 1008).

In certain implementations, before receiving the reply 82 confirming availability of the at least one qubit 40, the first classical computing device 20 receives from the quantum computing device 22 denial of availability of the at least one qubit 40. After a predetermined period of time, the first classical computing device 20 sends a query 76 to the quantum computing device 22 regarding availability of the at least one qubit 40.

In certain implementations, the first classical computing device 20, sends a query 76 to the quantum computing device 22 regarding availability of the at least one qubit 40 via a message broker 62 and receives from the quantum computing device 22 the reply 82 confirming availability of the at least one qubit 40 via the message broker 62.

In certain implementations, the quantum computing device 22 includes a first quantum computing device 22 and a second quantum computing device 22. In certain implementations, the at least one qubit 40 includes a plurality of qubits 40. At least a first portion of the plurality of qubits 40 are on the first quantum computing device 22, and at least a second portion of the plurality of qubits 40 are on the second quantum computing device 22.

Figure 3:
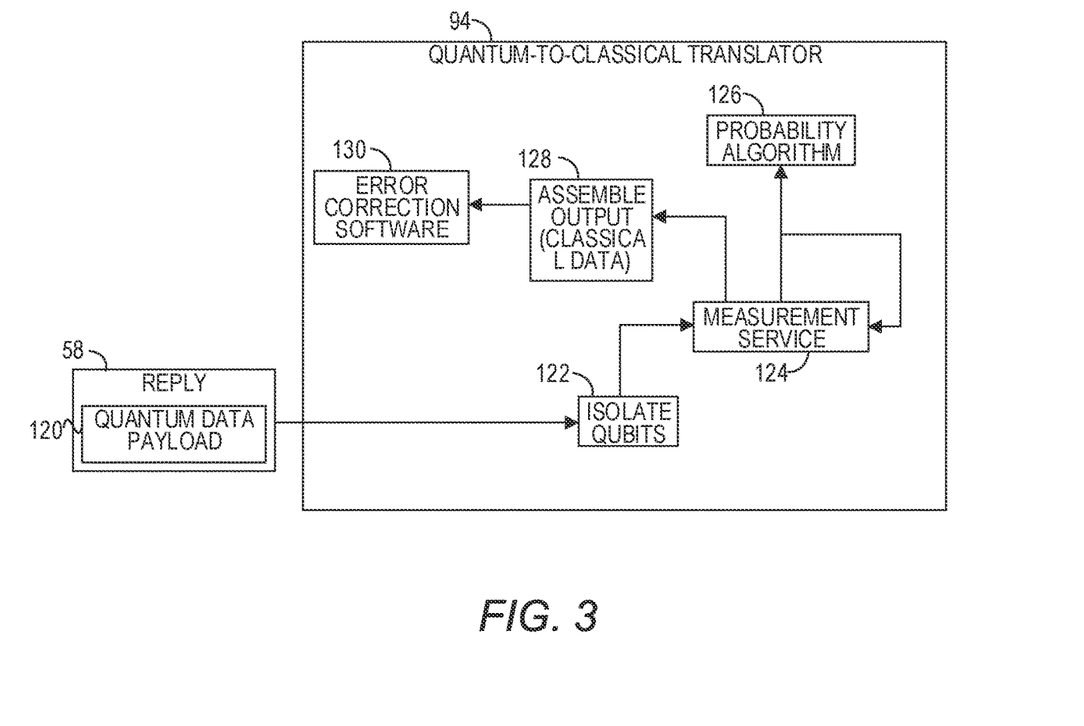
FIG. 3 is a block diagram that illustrates a quantum-to-classical translator according to one example.

FIG. 3 is a block diagram that illustrates the quantum-to-classical translator 94 according to one example. In a quantum computing environment 18, a primary difference between a classical bit and a qubit is superposition. A qubit can have a state of 1 and 0 simultaneously. In contrast, in the classical computing environment 14, a bit is binary and can have a value of only 1 or 0. A qubit can be represented as a sphere, with 1 and 0 on the North and South poles, and the actual state somewhere in between, or can be a linear combination of the states. A qubit has no equivalent in classical computing, and transferring the actual qubit to a classical computing environment is not feasible due to a difference in existing ambient temperatures, with qubits existing at a milli-Kelvin temperature.

When a measurement of a qubit is taken in the quantum computing environment 18, the measurement collapses to a classical state of 1 or 0, with the proximity to the appropriate pole (i.e., the Z-axis) dictating whether the state is 1 or 0. The measurement of a qubit in a superposition state appears random due to this, as it is a probability check: the outcome is sometimes 0 and sometimes 1. Accordingly, the measurement should be repeated multiple times to determine the likelihood of a qubit being in a particular state.

This is probabilistic in nature, so multiple measurement processes increase the likelihood of the state being accurate. To improve overall accuracy, classical error correction, such as a Cyclic Redundancy Check (CRC) check or a checksum, may be used to infer the state of the data.

An act of measurement of a qubit can result in the collapse of the quantum state, which is catastrophic for entanglement (decoherence). At a hardware level, a solution is to weakly couple each qubit to a microwave resonator whose resonance characteristics depend on the state of the qubit. Once the qubit operations are completed, the qubits may be measured by sending a microwave tone to their resonators and analyzing the signal it reflects back. The phase and amplitude of this reflected signal will be different depending on the qubit state.

For purposes of illustration, assume that the reply 82 (FIG. 1) has a payload 36 in qubits 40 rather than in the classical binary format. Referring now to FIG. 3, the quantum-to-classical translator 94 receives the reply message 58, which in this example has a quantum data payload 120 comprising a plurality of qubits 40. At functional block 122, the quantum-to-classical translator 94 isolates one qubit 40 at a time. Each qubit 40 is passed to a measurement service 124. The measurement service 124 takes N measurements of the superposition state of the qubit 40, which will collapse down (weakly) to either a classical 1 or a 0. In other words, the greater the value of N, the greater number of measurements taken, the higher the probability of arriving at the true state of 1 or 0. A probability algorithm 126, which has a threshold for acceptable errors, controls how many times (N) the measurement will occur. The probability algorithm 126 determines when the threshold is reached. Until the threshold is reached, the measurement service 124 repeatedly takes measurements. After the threshold is reached, at block 128, the quantum-to-classical translator 94 assembles the non-superposition bits in the proper order. This process occurs multiple times, once for each qubit 40 in the quantum data payload 120. Because the assembled data may not be at 100% accuracy, at block 130, the quantum-to-classical translator 94 implements error correction software to arrive at one hundred percent accuracy.

Figure 4:
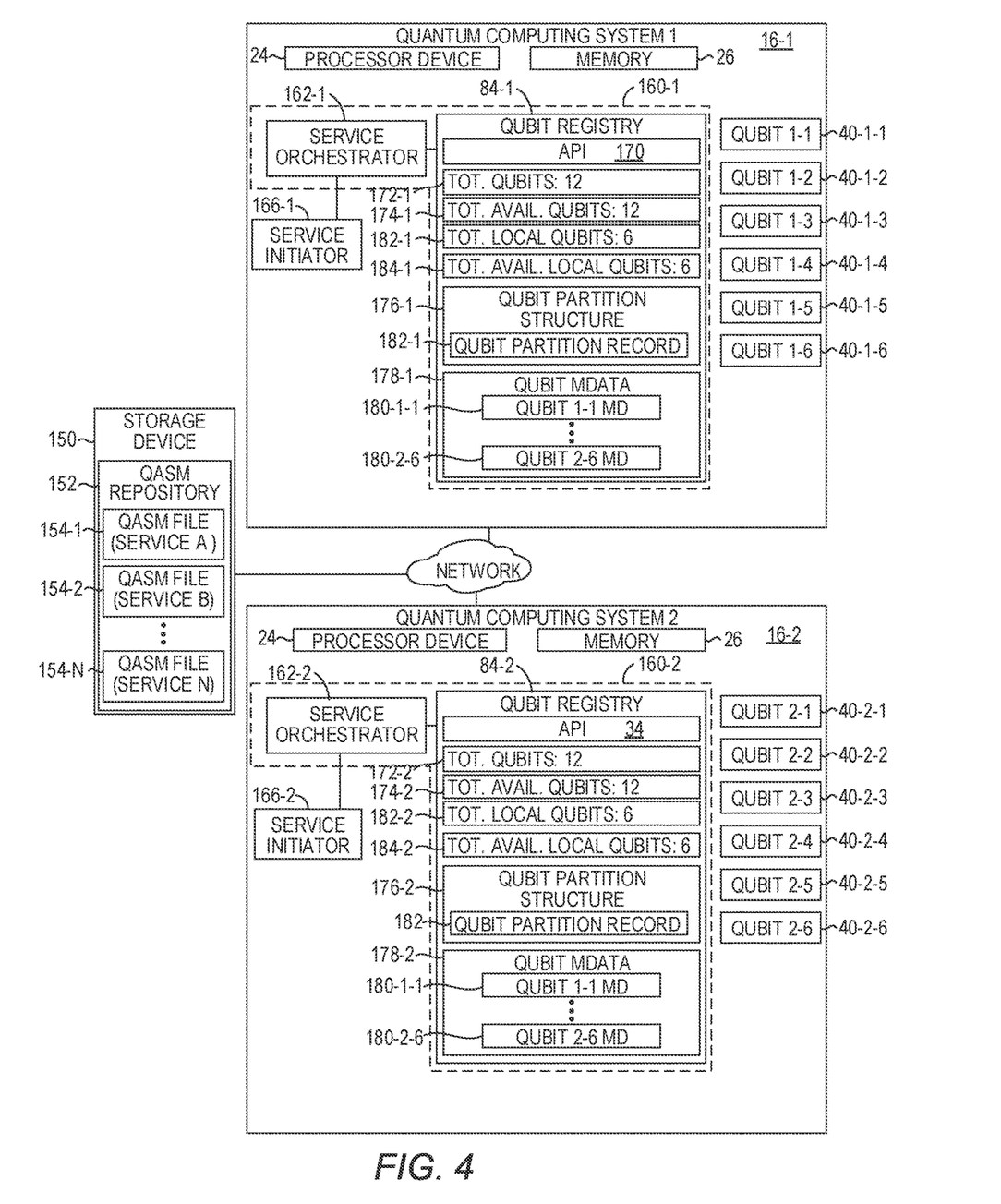
FIG. 4 is a block diagram of a distributed qubit allocation service according to one implementation.

FIG. 4 is a block diagram of a distributed qubit allocation service according to one implementation. The quantum computing systems 16-1, 16-2 include one or more processor devices 24 and a memory 26. The quantum computing system 16-1 is communicatively coupled to a storage device 150 on which a quantum assembly (QASM) repository 152 is stored. The QASM repository 152 includes a plurality of QASM files 154-1, 154-2-154-N, at least some of which implement a quantum service 96.

In certain implementations, each quantum service 96 is implemented via a corresponding QASM file 154-1-154-N, each of which comprises quantum computing instructions. In this example, the QASM file 154-1 corresponds to a quantum service A; the QASM file 154-2 corresponds to a quantum service B; and the QASM file 154-N corresponds to a quantum service N. The QASM repository 152 may contain tens, hundreds, thousands or more QASM files 154-1-154-N.

The quantum computing system 16-1 includes a qubit allocation service 160-1. The qubit allocation service 160-1 can be implemented via any number of functional blocks and data structures. Solely for purposes of illustration, the qubit allocation service 160-1 will be described as comprising a service 162-1 and a qubit registry 84-1, but it will be apparent that the functionality described herein with respect to the service orchestrator 162-1 and the qubit registry 84-1 could be divided into any number of functional processes and data structures. In some implementations, the qubit registry 84-1 may be a data structure, and functional processing is implemented by the service orchestrator 162-1. In other implementations, such as the implementation described herein, the qubit registry 84-1 may be a combination of one or more data structures and functional components that implement functionality in addition to the functionality implemented by the service orchestrator 162-1. It will be noted that, because the service orchestrator 162-1 and the qubit registry 84-1 are components of the qubit allocation service 160-1, functionality implemented by the service orchestrator 162-1 and/or the qubit registry 84-1 may at times herein be attributed to the qubit allocation service 160-1.

Each quantum computing system 16-1 implements a plurality of qubits 40-1-1-40-1-6 (generally, qubits 40). The quantum computing system 16-1 is capable of initiating a plurality of different quantum services 96. The quantum computing system 16-1 includes a qubit allocation service 160-1. The qubit allocation service 160-1 can be implemented via any number of functional blocks and data structures. Solely for purposes of illustration, the qubit allocation service 160-1 will be described as comprising a service orchestrator 162-1 and a qubit registry 84-1, but it will be apparent that the functionality described herein with respect to the service orchestrator 162-1 and the qubit registry 84-1 could be divided into any number of functional processes and data structures. In some implementations, the qubit registry 84-1 may be a data structure, and functional processing is implemented by the service orchestrator 162-1. In other implementations, such as the implementation described herein, the qubit registry 84-1 may be a combination of one or more data structures and functional components that implement functionality in addition to the functionality implemented by the service orchestrator 162-1. It will be noted that, because the service orchestrator 162-1 and the qubit registry 84-1 are components of the qubit allocation service 160-1, functionality implemented by the service orchestrator 162-1 and/or the qubit registry 84-1 may at times herein be attributed to the qubit allocation service 160-1.

Moreover, because the qubit allocation service 160-1 itself is a component of the quantum computing system 22-1, functionality implemented by the qubit allocation service 160-1 may be attributed to the quantum computing system 22-1 generally. Moreover, in examples where the qubit allocation service 160-1 comprises software instructions that program the processor device 12 to carry out functionality discussed herein, functionality implemented by the qubit allocation service 160-1 may be attributed herein to the processor device 12.

The distributed qubit allocation service includes the qubit allocation service 160-1 implemented on the quantum computing system 16-1 and a qubit allocation service 160-2 implemented on a quantum computing system 16-2. The qubit allocation service 160-2 and the quantum computing system 16-2 operate substantially similarly to the qubit allocation service 160-1 and the quantum computing system 16-1 discussed above, except as otherwise discussed herein. While for purposes of illustration, the distributed qubit allocation service illustrates two qubit allocation services 160-1, 160-2, in practice, the distributed qubit allocation service may include any number of qubit allocation services.

A service initiator 30-1 may communicate with the service orchestrator 162-1 to initiate a quantum service. By way of non-limiting example, the service initiator 30-1 may be a scheduler function that initiates quantum services via the service orchestrator 162-1 in accordance with a schedule or may comprise an operator user interface (UI) with which an operator 32 interacts to initiate quantum services via the service orchestrator 162-1.

The service orchestrator 162-1 communicates with the qubit registry 84-1 via any suitable inter-process communications mechanism. In some implementations, the service orchestrator 162-1 communicates with the qubit registry 84-1 via an application programming interface (API) 170. The qubit registry 84-1 maintains information about the qubits 40-1-1-40-1-6, including, by way of non-limiting example, a total qubits counter 172-1 via which the qubit allocation service 160-1 keeps track of the total number of qubits implemented by the quantum computing system 22-1, a total available qubit counter 174-1 via which the qubit allocation service 160-1 keeps track of the total number of qubits that are currently available for allocation, and a qubit partition structure 176-1 used by the qubit allocation service 160-1 to implement qubit partitions, as discussed in greater detail below. The qubit registry 84-1 also maintains qubit metadata 178-1, which comprises a plurality of metadata records 180-1-1-180-1-6, each of which maintains information about a corresponding qubit 40-1-1-40-1-6, such as, by way of non-limiting example, an identifier of the corresponding qubit 40-1-1-40-1-6, a quantum service identifier of the quantum service currently using the corresponding qubit 40-1-1-40-1-6, whether the corresponding qubit 40-1-1-40-1-6 is currently in an entangled state, or the like.

At the point in time illustrated in FIG. 1, a quantum service 96 is executing on the quantum computing system 22-1. A qubit partition record 182-1 is associated with the quantum service 96 and indicates that the quantum service 96 has "ownership" of the two qubits 40-1-1 and 40-1-2. The qubit partition record 182-1 implements a qubit partition, which partitions the qubits 40-1-1 and 40-1-2 from the qubits 40-1-3-40-1-6, and which limits the view of the qubit registry 84-1, by the quantum service 96, to the qubits 40-1-1 and 40-1-2. The total qubits counter 172-1 contains a value of six, and the total available qubits counter 174-1 contains a value of four since the two qubits 40-1-1 and 40-1-2 have been allocated to the quantum service 96.

In some implementations, the quantum service 96 may interact directly with the qubit registry 84-1 via the API 170 to obtain certain information about any qubits that have been allocated to the quantum service 96. For example, the quantum service 96 may request how many qubits of the quantum computing system 22-1 are available to the quantum service 96. The qubit registry 84-1 determines that the quantum service 96 is associated with the qubit partition record 182-1, accesses the qubit partition record 182-1, and responds to the quantum service 96 that the quantum service 96 has access to two qubits, 40-1-1 and 40-1-2. The quantum service 96 may access the qubit registry 84-1 directly via the 170 to obtain the metadata records 180-1-1 and 180-1-2 that correspond to the qubits 40-1-1 and 40-1-2. If the quantum service 96 has not been allocated any qubits 40-1-1-40-1-6, then the qubit registry 84-1 would respond to any queries with responses that indicate the availability of qubits 40. For example, if none of the qubits 40-1-1-40-1-6 have been allocated to a quantum service 96, and the query requests how many qubits are available, the qubit registry 84-1 responds that no qubits are available.

The quantum computing system 22-2 implements six qubits 40-2-1-40-2-6. The qubit allocation services 160-1-160-2 communicate with one another via qubit update records to keep the qubit allocation services 160-1-160-2 synchronized with one another. Each qubit allocation service 160-1-160-2 is thus aware of the qubits implemented on both of the quantum computing systems 16-1-16-2 and can allocate and deallocate any of the qubits 40-1-1-40-2-6. The qubit allocation service 160-1 maintains the total qubits counter 172-1, which maintains track of the total number of qubits available over both the quantum computing systems 16-1 and 16-2. The qubit allocation service 160-1 maintains the total available qubits counter 174-1, which maintains track of the total number of qubits on both the quantum computing systems 16-1 and 16-2 that are currently allocatable. The qubit allocation service 160-1 maintains a total local qubits counter 182-1, which maintains track of the total number of qubits implemented locally on the quantum computing system 16-1, and maintains a total available local qubits counter 184-1, which maintains track of the number of local qubits that are available to be allocated.

The qubit allocation service 160-2 interacts with a service orchestrator 162-2, which in turn may interact with a service initiator 30-2. The qubit allocation service 160-2 includes a qubit registry 84-2, which maintains a total qubits counter 172-2, which maintains track of the total number of qubits available over both the quantum computing systems 16-1 and 16-2. The qubit allocation service 160-2 maintains a total available qubits counter 174-2, which maintains track of the total number of qubits on both the quantum computing systems 16-1 and 16-2 that are currently allocatable. The qubit allocation service 160-2 maintains a total local qubits counter 182-2, which maintains track of the total number of qubits implemented locally on the quantum computing system 16-2, and maintains a total available local qubits counter 184-2, which maintains track of the number of local qubits that are available to be allocated.

The qubit registry 84-2 maintains a qubit partition structure 176-2, which maintains information about which qubits 40-1-1-40-2-6 are associated with qubit partitions. The qubit registry 84-2 also maintains qubit metadata 178-2, which comprises a plurality of metadata records 74-1-1-74-2-6, each of which maintains information about a corresponding qubit 40-1-1-40-2-6, such as, by way of non-limiting example, an identifier of the corresponding qubit 40-1-1-40-2-6, a quantum service identifier of the quantum service currently using the corresponding qubit 40-1-1-40-2-6, whether the corresponding qubit 40-1-1-40-2-6 is currently in an entangled state or the like.

Figure 5:
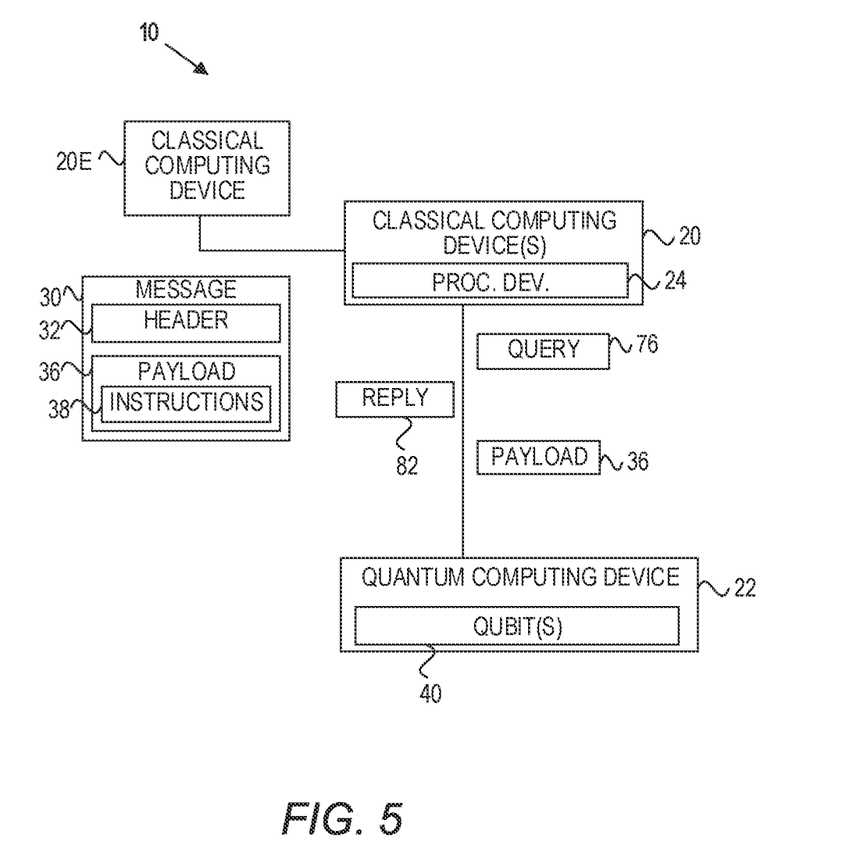
FIG. 5 is a simplified block diagram of the system illustrated in FIG. 1 according to another example.

FIG. 5 is a simplified block diagram of the system illustrated in FIG. 1, according to another example. The system 10 includes a first classical computing device 20, including one or more processor devices 24. The first classical computing device 20 receives a message 30 sent from a second classical computing device 20 toward a quantum computing device 22. The message 30 includes a header 32 and a payload 36. The payload 36 provides instructions 38 for at least one qubit 40 within the quantum computing device 22.

The first classical computing device 20 extracts the payload 36 from the message 30. The first classical computing device 20 sends a query 76 to the quantum computing device 22 regarding availability of the at least one qubit 40. The first classical computing device 20 receives from the quantum computing device 22 a reply 82 confirming availability of the at least one qubit 40. The first classical computing device 20 sends the payload 36 to the quantum computing device 22.

Figure 6:
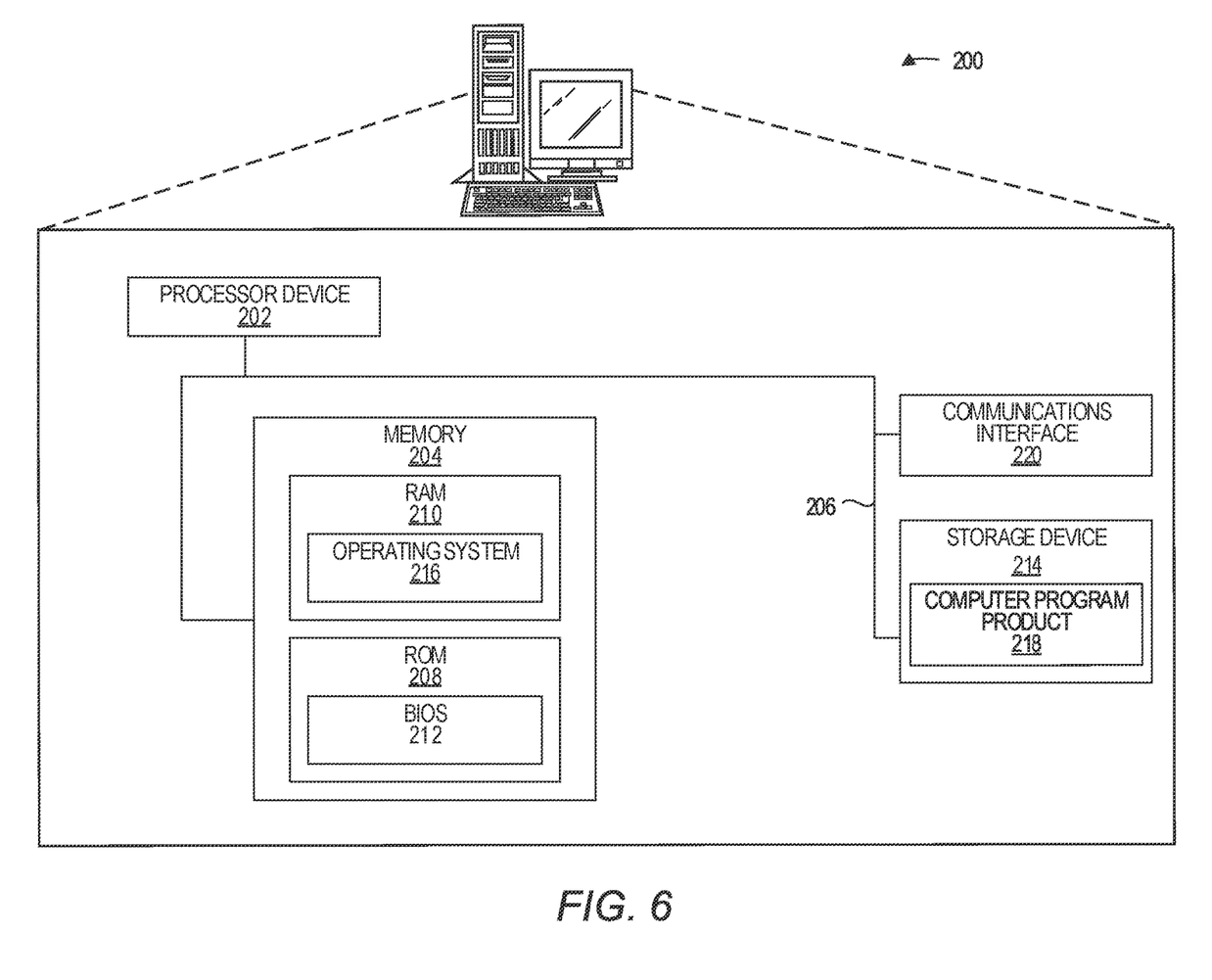
FIG. 6 is a block diagram of a classical computing device illustrated in FIG. 1 according to one example.

FIG. 6 is a block diagram of a classical computing device 200 containing components suitable for implementing any of the processing devices disclosed herein. The computing device 200 includes a processor device 202, a system memory 204, and a system bus 206. The system bus 206 provides an interface for system components including, but not limited to, the system memory 204 and the processor device 202. The processor device 202 can be any commercially available or proprietary processor.

The system bus 206 may be any of several types of bus structures that may further interconnect to a memory bus (with or without a memory controller), a peripheral bus, and/or a local bus using any of a variety of commercially available bus architectures. The system memory 204 may include non-volatile memory 208 (e.g., read-only memory (ROM), erasable programmable read-only memory (EPROM), electrically erasable programmable read-only memory (EEPROM), etc.), and volatile memory 210 (e.g., random-access memory (RAM)). A basic input/output system (BIOS) 212 may be stored in the non-volatile memory 208 and can include the basic routines that help transfer information between elements within the computing device 200. The volatile memory 210 may also include a high-speed RAM, such as static RAM, for caching data.

The computing device 200 may further include or be coupled to a non-transitory computer-readable storage medium such as the storage device 214, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 214 and other drives associated with computer-readable media and computer-usable media may provide non-volatile storage of data, data structures, computer-executable instructions, and the like.

A number of modules can be stored in the storage device 214 and in the volatile memory 210, including an operating system 216 and one or more program modules, which may implement the functionality described herein in whole or in part. All or a portion of the examples may be implemented as a computer program product 218 stored on a transitory or non-transitory computer-usable or computer-readable storage medium, such as the storage device 214, which includes complex programming instructions, such as complex computer-readable program code, to cause the processor device 202 to carry out the steps described herein. Thus, the computer-readable program code can comprise software instructions for implementing the functionality of the examples described herein when executed on the processor device 202. The processor device 202, in conjunction with the network manager in the volatile memory 210, may serve as a controller or control system for the computing device 200 that is to implement the functionality described herein.

The computing device 200 may also include one or more communication interfaces 220, depending on the particular functionality of the computing device 200. The communication interfaces 220 may comprise one or more wired Ethernet transceivers, wireless transceivers, fiber, satellite, and/or coaxial interfaces by way of non-limiting examples.

Figure 7:
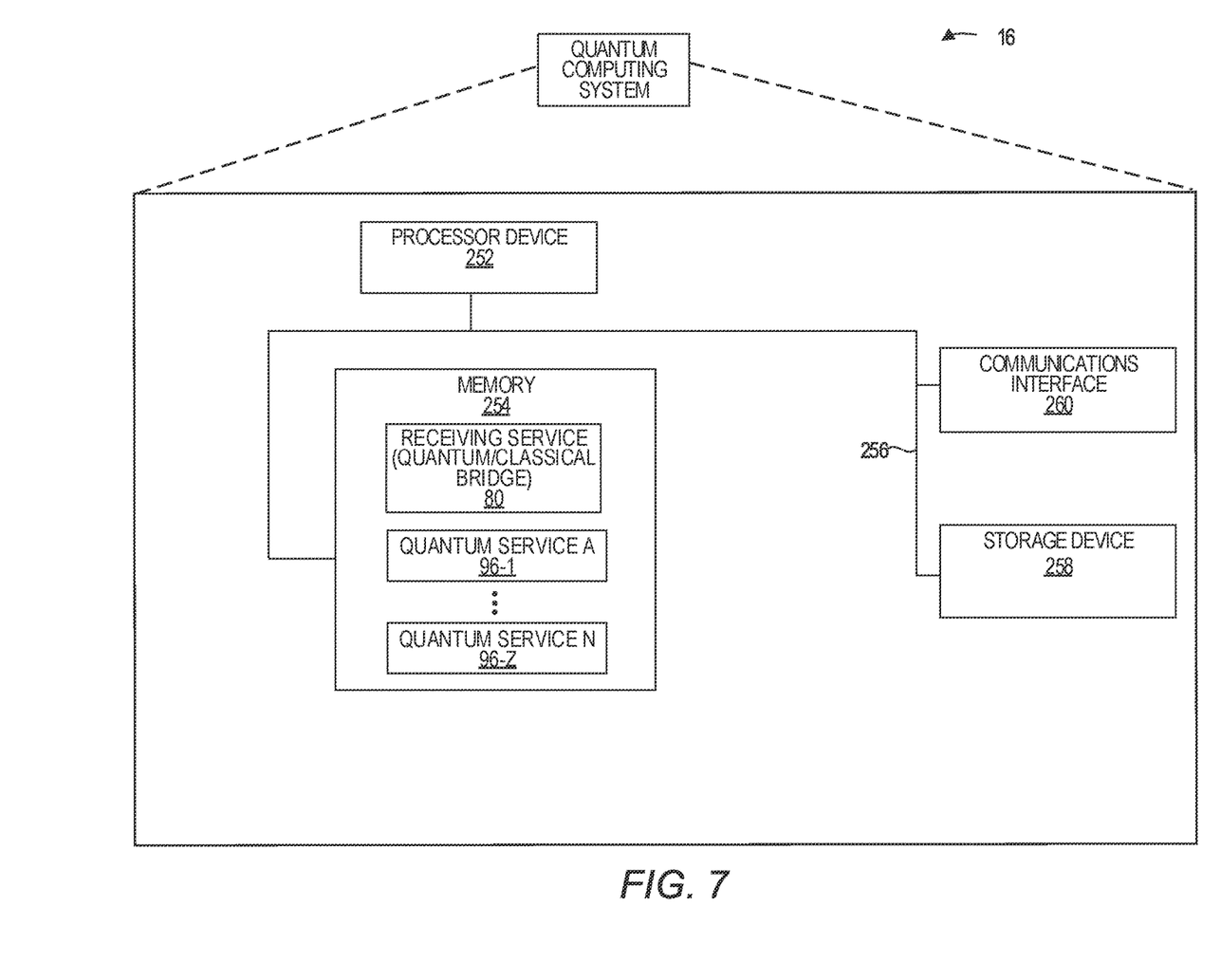
FIG. 7 is a block diagram of the quantum computing system illustrated in FIG. 1 according to one example.

FIG. 7 is a block diagram of the quantum computing device 22 suitable for implementing examples according to one example. The quantum computing system 16 may comprise any computing or electronic device capable of including firmware, hardware, and/or executing software instructions to implement the functionality described herein in a quantum environment. The quantum computing system 16 includes the one or more processor devices 252, the one or more memories 254, and a system bus 256. The system bus 256 provides an interface for system components including, but not limited to, the one or more memories 254 and the one or more processor devices 252. The processor devices 252 can be any commercially available or proprietary processor suitable for operating in a quantum environment. The quantum computing system 16 may further include or be coupled to a non-transitory computer-readable storage medium such as the storage device 258. The storage device 258 and other drives associated with computer-readable media and computer-usable media may provide non-volatile storage of data, data structures, computer-executable instructions, and the like.

A number of modules can be stored in the storage device 258 and in the memory 254, including the qubit allocation service 160-1 and the qubit registry 84-1. In some implementations, all or a portion of the qubit registry 84-1 may be maintained on the storage device 258, in the memory 254, or both. All or a portion of the examples may be implemented as a computer program product stored on a transitory or non-transitory computer-usable or computer-readable storage medium, such as the storage device 258, which includes complex programming instructions, such as complex computer-readable program code, to cause the one or more processor devices 252 to carry out the steps described herein. Thus, the computer-readable program code can comprise software instructions for implementing the functionality of the examples described herein when executed on the one or more processor devices 252.

An operator, such as the operator, may also be able to enter one or more configuration commands through a keyboard (not illustrated), a pointing device such as a mouse (not illustrated), or a touch-sensitive surface (not illustrated). The quantum computing system 16 may also include a communications interface 260 suitable for communicating with other computing devices, including, in some implementations, classical computing devices.

Other computer system designs and configurations may also be suitable to implement the systems and methods described herein. The following examples illustrate various additional implementations in accordance with one or more aspects of the disclosure.

Those skilled in the art will recognize improvements and modifications to the preferred implementations of the disclosure. All such improvements and modifications are considered within the scope of the concepts disclosed herein and the claims that follow.

What is claimed is:

1. A method comprising:
   receiving, by a first classical computing device comprising one or more processor devices, a message sent from a second classical computing device toward a quantum computing device, the message including a header and a payload, the payload providing instructions for at least one qubit within the quantum computing device, wherein the payload comprises at least one destination address of the at least one qubit;
   extracting, by the first classical computing device, the payload from the message;
   sending, by the first classical computing device, a query to the quantum computing device regarding availability of the at least one qubit;
   receiving, by the first classical computing device, from the quantum computing device a reply confirming the availability of the at least one qubit; and
   sending, by the first classical computing device, the payload to the quantum computing device.

2. The method of claim 1 wherein the header comprises a Hypertext Transfer Protocol (HTTP) header.

3. The method of claim 1 wherein the instructions comprise a data request to insert data into the at least one qubit.

4. The method of claim 1 wherein the instructions comprise a manipulation request to modify a characteristic of the at least one qubit.

5. The method of claim 4 wherein the characteristic comprises at least one of spin, polarization, superposition, or entanglement.

6. The method of claim 1 wherein the instructions comprise a reserve request to reserve the at least one qubit.

7. The method of claim 1 wherein the payload is devoid of a destination address of a quantum service or the quantum computing device.

8. The method of claim 1 wherein the payload comprises a Quantum Assembly Language (QASM) file comprising the instructions.

9. The method of claim 1 further comprising:
   prior to receiving the reply confirming the availability of the at least one qubit, receiving, by the first classical computing device, from the quantum computing device denial of the availability of the at least one qubit; and
   after a predetermined period of time, sending, by the first classical computing device, a second query to the quantum computing device regarding the availability of the at least one qubit.

10. The method of claim 1 wherein:
    sending, by the first classical computing device, the query to the quantum computing device regarding the availability via a message broker; and
    receiving, by the first classical computing device, from the quantum computing device the reply confirming the availability via the message broker.

11. The method of claim 1 wherein the quantum computing device comprises a first quantum computing device and a second quantum computing device.

12. The method of claim 11 wherein the at least one qubit comprises a plurality of qubits, at least a first portion of the plurality of qubits on the first quantum computing device, and at least a second portion of the plurality of qubits on the second quantum computing device.

13. A first classical computing device comprising:
    a memory; and one or more processor devices coupled to the memory, the one or more processor devices programmed to:
- receive a message sent from a second classical computing device toward a quantum computing device, the message including a header and a payload, the payload providing instructions for at least one qubit within the quantum computing device
- wherein the payload comprises at least one destination address of the at least one qubit;
- extract the payload from the message;
- send a query to the quantum computing device regarding availability of the at least one qubit;
- receive from the quantum computing device a reply confirming the availability of the at least one qubit; and
- send the payload to the quantum computing device.

14. The first classical computing device of claim 13 wherein the header comprises a Hypertext Transfer Protocol (HTTP) header.

15. The first classical computing device of claim 13 wherein the payload comprises at least one of:
- a data request to insert data into the at least one qubit;
- a manipulation request to modify a characteristic of the at least one qubit; and
- a reserve request to reserve the at least one qubit.

16. The first classical computing device of claim 13 wherein the one or more processor devices are further programmed to:
- prior to receiving the reply confirming the availability of the at least one qubit, receive, from the quantum computing device, a denial of availability of the at least one qubit; and
- after a predetermined period of time, send a second query to the quantum computing device regarding availability of the at least one qubit.

17. The first classical computing device of claim 13 wherein the quantum computing device comprises a first quantum computing device and a second quantum computing device; and
- wherein the at least one qubit comprises a plurality of qubits, at least a first portion of the plurality of qubits on the first quantum computing device, and at least a second portion of the plurality of qubits on the second quantum computing device.

18. A non-transitory computer-readable storage medium that includes instructions to cause a processor device of a first classical computing device to:
- receive a message sent from a second classical computing device toward a quantum computing device, the message including a header and a payload, the payload providing instructions for at least one qubit within the quantum computing device, wherein the payload comprises at least one destination address of the at least one qubit;
- extract the payload from the message;
- send a query to the quantum computing device regarding availability of the at least one qubit;
- receive from the quantum computing device a reply confirming the availability of the at least one qubit; and
- send the payload to the quantum computing device.

* * * * *